July 26, 1949.  W. A. MELSOM  2,477,193
HOSE COUPLING
Filed July 20, 1946  2 Sheets-Sheet 1
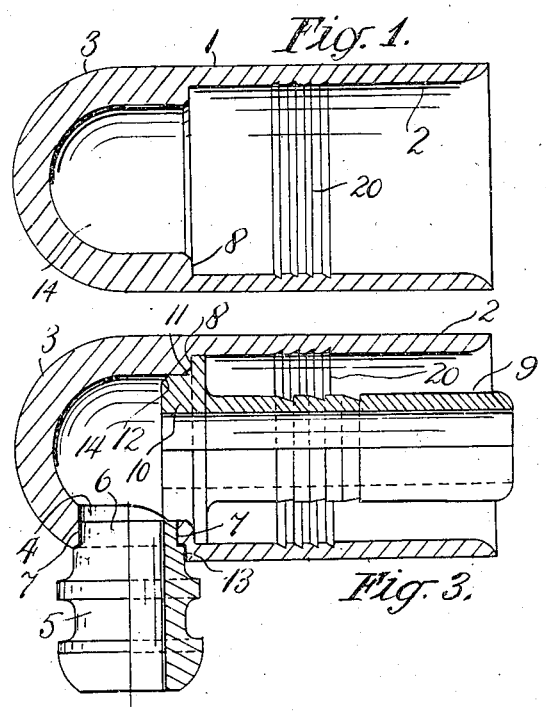
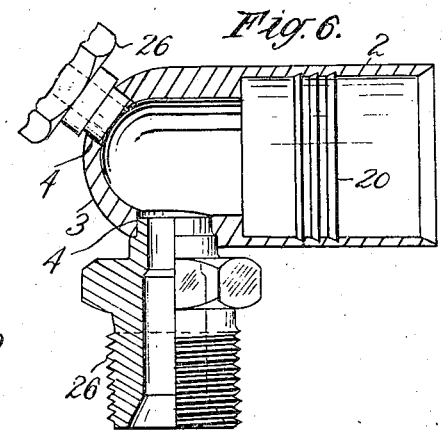
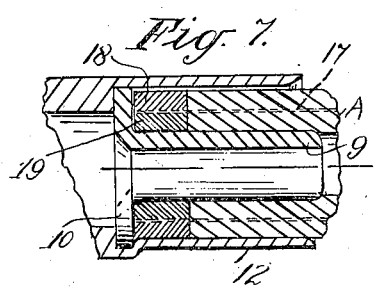
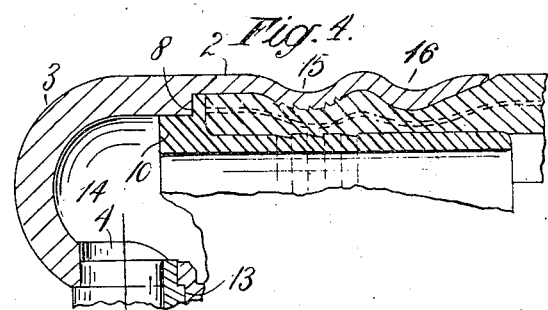
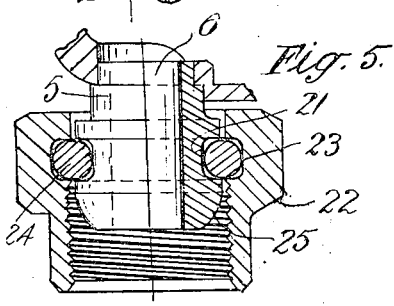
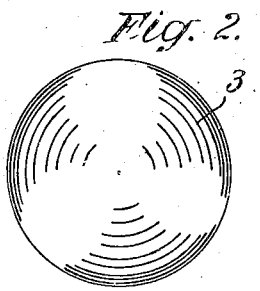
Walter Arthur Melsom
INVENTOR
Albert F Nathan Atty

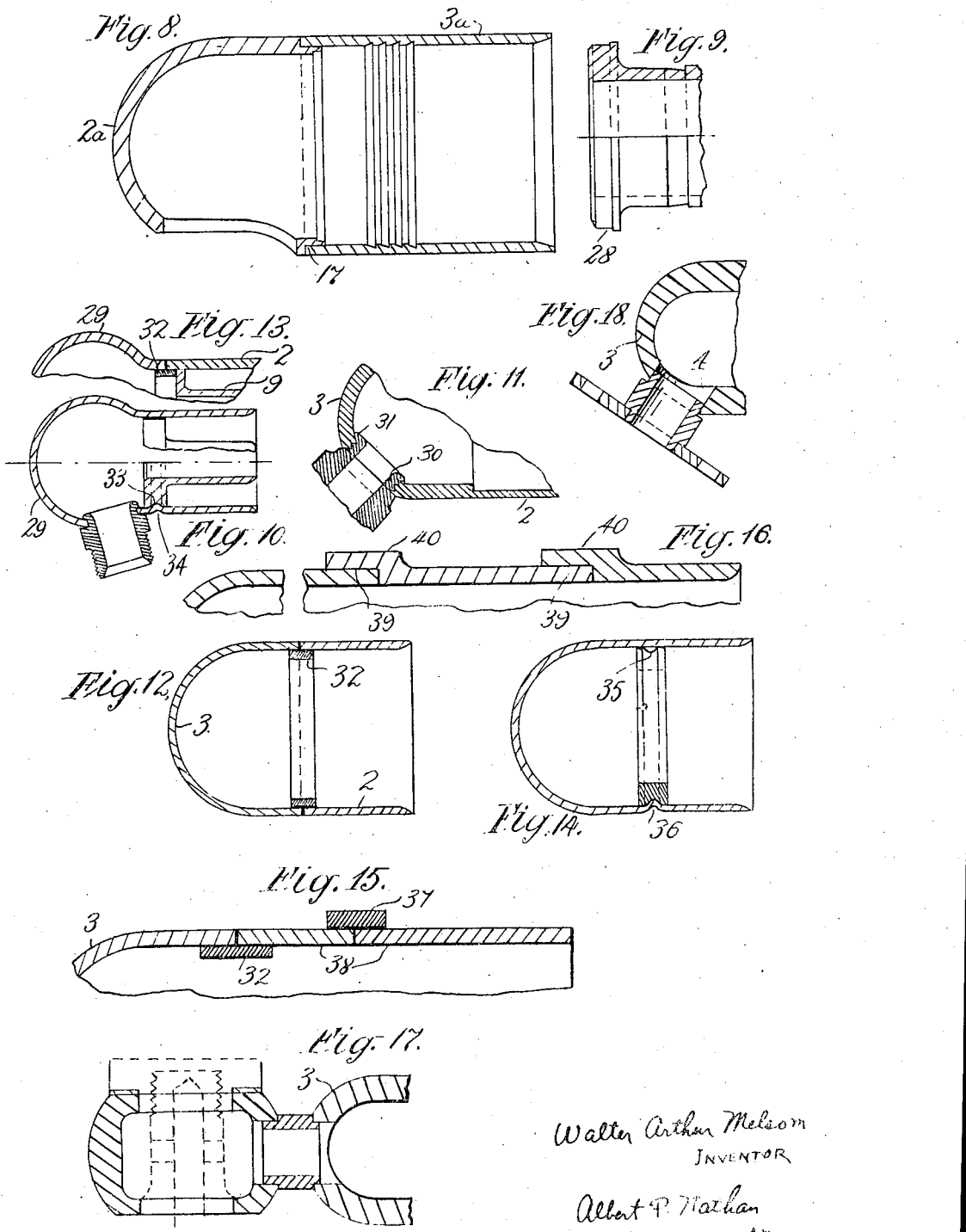

Patented July 26, 1949

2,477,193

UNITED STATES PATENT OFFICE 2,477,193

HOSE COUPLING

Walter Arthur Melsom, Wembley, England, assignor to Bowden (Engineers) Limited, London, England Application July 20, 1946, Serial No. 685,256
In Great Britain July 28, 1945

4 Claims. (Cl. 285—84)

The present invention relates to flexible hose couplings and to hose end fittings therefor, and particularly to the ferrules in combination with other parts of the fitting.

Usually these fittings comprise an insert between which and the ferrule the hose is secured by contracting the ferrule, the fitting serving as the means whereby the hose may be coupled up to a companion part in alignment with the bore of the insert, common coupling methods being to provide a male or female thread on or in the free end of the insert or ferrule or to mount a union nut on such free end.

In some cases, however, as for the purpose of compactness in, or adaptability to, the lay-out of the system in which the hose is to be arranged, it is desirable for the conduit to turn at an angle from that portion thereof which passes through the hose securing part of the fitting, and this angle may require to be varied, and in some cases it is desirable to branch the conduit, e. g., into two or more branches.

The main object of the present invention is to provide an improved construction of ferrule which will serve as a stock unit which is readily adapted to receive a co-operating connecting component through the medium of which the desired coupling can be made at any desired practical angle and is equally adaptable to receive two or more such components for branching the flow.

According to the present invention the ferrule is made in the form of a cup-shaped element, preferably a deep-cylindrical cup-shaped element, and it comprises a peripheral wall for fitting round a hose or the like and an end wall adapted to be apertured to receive a connecting component, such end wall being of part-spherical or like form to facilitate choice of direction in which the aperture is formed and the component located, and to permit of two or more apertures being formed and two or more connecting components fitted in different directions when required.

The connecting component may be any suitable part adapted to be sealed to the ferrule and allow flow into or out of the aperture therein, e. g., it may be the end of a pipe, a nipple, male or female screw, banjo, or flange, and the construction according to the invention permits of making a hole or holes of the desired size in any practicable direction and connecting to the ferrule any suitably selected type or size of component or components as may be required.

The ferrule may have a hemi-spherical closed end, or a bulbous end, in which a hole is formed, e. g., drilled, subsequently, in any convenient practicable direction and a connecting component as aforesaid is secured in said hole. Further two or more holes may be drilled in the closed end to receive branching components at desired angles to one another.

The connecting component or components may be spigoted into the aperture or apertures and secured by silver soldering, copper brazing, welding or a like metal bonding process or may be screwed and riveted in the aperture. The wall thickness of such closed end is preferably greater than that of the cylindrical portion of the ferrule which is to be contracted to secure it to the hose (especially where such portion of the ferrule is thin), and it may be advantageous, as will be later described, for the thicker wall to extend some way along the cylindrical part of the ferrule from the part-spherical end.

The thickened end wall is advantageous as it gives the wall of the hole made therein adequate length and bearing surface effectively to receive the connecting component, especially when the latter is secured to said wall by copper brazing, silver soldering or a like process as aforesaid. It may be further advantageous since the shoulder formed, preferably a radial shoulder, at the junction between the thinner and contractible part of the ferrule and the thicker end wall may serve as an abutment for the insert, and offers greater resistance to internal pressure. However the thickened end wall is not essential and facility of manufacture may be promoted in some cases, e. g., where the ferrule is made by deep-drawing, by making the ferrule of uniform wall thickness, or with the part-spherical end even thinner than the contractible portion of the ferrule, where the method adopted of fixing the connecting component to the closed end wall will produce a secure connection. By way of example, such a construction may serve well when the connecting component is welded to the closed end. The end wall may be of varying wall thickness, e. g., varying from a minimum on the axis of the ferrule to a maximum where it joins and extends along the cylindrical or peripheral portion so that in this way may be obtained a saving in weight and an increase in the chamber size hereinafter mentioned.

The ferrule may be advantageously constructed to form a chamber in the end wall which provides an enlargement of the conduit through the fitting where should the direction of flow change, this will conduce to a steadier flow round the bend.

The ferrule may be made in one piece or not, e. g., it may be made up of an end wall component and a peripheral wall component or components.

The ferrule and one or more connecting components fitted thereto may form a unit, adapted to receive or be combined with, an insert, or the ferrule and insert may form a unit to which one or more connecting components may be fitted as aforesaid.

The end of the insert which is secured within the ferrule, may make a light interference fit in the cylindrical portion of the end of the ferrule (although a non-interference fit is suitable in some cases) the choice being largely dependent upon the particular method by which the fitting is secured to the hose and may also be formed with a collar which abuts a shoulder when such is provided on the ferrule, when the insert is fully inserted into the ferrule.

The hose may be secured to the fitting in any suitable or well known manner, for producing a clamping and sealing union between the fitting and the hose, e. g., the ferrule may be contracted generally or locally in one or more places, and in some cases where the hose is reinforced by an embedded tubular layer or layers of metallic braiding or other suitable reinforcing material this may be directly gripped.

The ferrule (or the peripheral portion thereof) may be made of a material suited to contraction, such as brass, aluminium alloy, low carbon steel, or Phosphor bronze.

In order that the present invention may be the more readily understood, reference is hereinafter made to the constructional forms illustrated by way of example in the accompanying drawings, in which:

Fig. 1 is a sectional elevation of one form of ferrule according to the invention before it has been apertured to receive a connecting component, Fig. 2 is an end view thereof, Fig. 3 is a sectional elevation of the ferrule with a connecting component and an insert fitted thereto, Fig. 4 is a sectional elevation (partly broken away) showing a hose secured between the ferrule and insert and Fig. 5 is a fragmentary sectional elevation showing a union nut fitted to the connecting component.

Fig. 6 is a sectional elevation of a modified form of ferrule with two connecting components of different form fitted thereto.

Fig. 7 is a sectional elevation showing another suitable way of clamping the hose, between the ferrule and insert.

Fig. 8 is a sectional elevation of another modified form of ferrule.

Fig. 9 is a part sectional elevation of an insert suitable for use therewith.

Fig. 10 is a sectional elevation of a form of ferrule with a bulbous end wall and showing one way of securing the insert to the ferrule.

Fig. 11 shows a screwed and riveted connection of the connecting component in the ferrule.

Figs. 12 and 13 show two forms of composite ferrules of modified form.

Fig. 14 is a sectional elevation of another form of ferrule and Figs. 15 and 16 are fragmentary sectional views of yet further modified forms of the ferrule. Figs. 17 and 18 are fragmentary views showing banjo and flange connections to the ferrule.

Referring to Fig. 1, the ferrule 1 is made in the form of a cup-shaped element, preferably a deep cylindrical cup-shaped element, as shown, with a cylindrical peripheral wall 2 and a hemi-spherical closed end wall 3.

Into this closed end wall (see Figs. 2 and 3) a hole 4 is formed, e. g., drilled, in any suitable chosen direction as may be desired for the particular application of a given coupling, in the form illustrated at right angles to the axis of the ferrule. A connecting component, in this case a nipple 5, is secured in said hole, its angular relation to the axis of the ferrule being determined by the disposition of the hole.

In the form being described, the wall thickness of such closed end wall is greater than that of the cylindrical portion 2 of the ferrule which is to receive the hose, and the thicker wall extends some way along the cylindrical part of the ferrule from the hemispherical end.

The ferrule may be formed by deep drawing, or from the solid, or in any suitable way.

The spigot of the nipple is secured in the hole by copper brazing, silver soldering, or a like process, the join being diagrammatically indicated at 7. Alternatively it may be screwed and riveted to the ferrule as shown in Fig. 10.

The thicker end wall terminates abruptly to provide a shoulder 8 at the junction between the thinner and contractible part 2 of the ferrule and the thicker end part 3 to serve as an abutment for a rigid tubular insert 9.

The end of the insert which is secured within the ferrule is provided with a collar 10 which may fit in the cylindrical portion of the ferrule and should abut the shoulder 8 when the insert is fully inserted into the ferrule. The collar may make a light interference fit, or a non-interference fit in the ferrule, and be held and sealed to the shoulder 8 by the displaced rubber of the hose when this is secured to the fitting. The collar in this form makes a rabbeted engagement with the ferrule (its leading edge and/or the inner edge of the shoulder may be chamfered, as indicated in Fig. 3, if desired, to facilitate the engagement), or the collar may simply abut against the shoulder (as shown in the form illustrated in Fig. 7 and hereinafter described), or may make a tongue and groove or other suitable interlocking engagement with the ferrule.

Although other ways of connecting the connecting component to the ferrule are available, such as a screwed connection (as hereinafter referred to) or a tapering connection, we at present prefer to form a plain walled cylindrical hole in the end of the ferrule and to form the connecting component with a corresponding cylindrical spigot portion 6 which is inserted into the hole, and if desired, the hole may be counter-bored as shown at 13 and the shoulder of the connecting component brought to a predetermined position in relation to the ferrule, e. g., it may be positioned as shown so that the spigot does not intrude into the part-spherical chamber 14 formed within the end of the ferrule beyond the end of the insert as a local enlargement of the conduit.

The hose A may be secured within the ferrule in any convenient way, e. g., as described and claimed in my prior Patent No. 2,358,019, as shown in Fig. 4, by contracting the peripheral wall of the ferrule around the hose, by swaging, by extruding through a die or by any suitable contracting method. In the example shown in this figure the peripheral or cylindrical wall 2 of the ferrule is contracted at zones 15 and 16, but various other methods of securing the hose within the ferrule are available, e. g., as shown in Fig. 7, the hose A, where it comprises tubular layers of rubber or other suitable resilient material and a tubular layer 17 of reinforcing material, may be bared of rubber at one zone to expose the reinforcement which may be gripped, e. g., by suitable gripping members 18 and 19. These may be made so to grip the reinforcement when the peripheral portion of the ferrule is contracted as described and claimed in my prior Patent No. 2,374,224. In the illustration, the upper part shows the hose inserted into the ferrule, before contraction, and the lower part showing the cylindrical portion of the ferrule contracted. Or the outer gripping member could be such that it may be contracted independently of the sleeve to secure the hose to the insert and the sleeve passed over the gripping members subsequently and contracted to seal the hose to the fitting, as described and claimed in my prior Patent No. 2,384,635.

The contractible portion of the ferrule is shown of uniform thickness (save that it may be provided as shown, e. g., locally, with internal annular grooves or serrations 20 the better to grip the hose) or it may comprise one or more externally thickened bands where it is to be contracted.

The connecting component may be of any suitable form for attachment to a pipe or fitting. In the form shown in Fig. 5 it is a nipple adapted to be attached to a companion part by a screw union and for this purpose embodying a nut rotatably mounted on the nipple. For example the latter may be externally peripherally grooved at 21 and have a union nut 22 which is internally peripherally grooved at 23 rotatably secured to it by a rod 24 made to pass round the passage formed by the registered grooves in the manner described and claimed in my prior Patent No. 2,310,490, the outer end 25 of the nipple, which if desired may be rounded or tapered to make a metal-to-metal joint with a companion coupling part, being sealed to the latter by means of the nut, which may be provided with a female or a male thread as required. The nut 22 may be assembled after the ferrule has secured the hose.

Nuts of conventional pattern may however be employed.

Fig. 6 illustrates by way of example how more than one connecting component may be readily connected to the ferrule at any desired practicable angle, and also how the improved ferrule is adaptable to receive connecting components of varying size or character. In the example illustrated, male screw connecting components 26 are shown, but obviously two or more of the nipples already described, or other forms of connecting components, such as banjos (i. e., ring-components) (see Fig. 17), flanged components (see Fig. 18), female screw components, may equally well be spigoted into the apertures in any of the various forms of ferrule illustrated and different types and sizes of components may be secured to the same ferrule.

The ferrule may for convenience in manufacture be made of composite form, e. g., comprising an end wall component 2a and a peripheral wall component 3a as shown in Fig. 8. The components may be mated by a rabbeted joint 27 or by any other suitable joint, and secured together by copper brazing, or by any of the other like processes herein described. This form shows a ferrule (Fig. 8) and insert (Fig. 9) adapted to make a rabbeted engagement 28.

The end walls of the ferrules shown in Figs. 6 and 8 progressively increase in thickness from a minimum on the axis of the ferrule for the purposes previously described.

Fig. 10 shows a further modification in which the ferrule has a bulbous end 29 and this increases the available surface for making the desired connection or connections.

The insert could be made integral with the ferrule by soldering, screwing, axially locking or any other suitable process, for example, as shown in Fig. 10, the insert may be copper brazed in place (see the top half of the view), or it may have a groove 33 in which a local portion 34 of the ferrule is crimped. The ferrule here illustrated has peripheral and end walls of the same thickness.

The hole or holes in the ferrule end may in certain cases be threaded to receive a threaded nipple or other connecting component. Fig. 11 shows such a case, the correspondingly screw-threaded spigot 30 being riveted over at 31.

Figs. 12 and 13 are further examples of ferrules with unthickened end walls, the shoulder for the insert being formed by a separate ring member 32, which may be used whether the end and peripheral walls of the ferrule are in one piece or not. In these examples, the ring serves the additional purpose of securing separate end and peripheral wall components.

Fig. 14 shows a ring member grooved at 35 and secured within the ferrule by locally crimping the latter at 36, the ring member forming the shoulder for the insert.

Where the contractible portion of the ferrule is provided with one or more externally thickened bands as aforesaid, these may be integral with the said portion or may be in the form of a separate ring or rings 37 (see Fig. 15), if desired, secured by hydrogen brazing or by any of the like processes herein referred to. In some cases, e. g., for large couplings, it may be desirable to make the peripheral wall as shown in Fig. 15 in two or more ring or sleeve like parts 38 and in such a case a convenient method of joining them and at the same time of providing an externally thickened band or bands is to secure each band around the adjacent ends of such parts by copper brazing or the like.

Fig. 16 shows an alternative method of joining the ring parts, viz., by spigot and faucet connection 39, and of forming an external band 40. This form facilitates locating the parts for brazing or the like.

The improvements according to the present invention may be very well incorporated in hose coupling components as described and claimed in my prior Patents Nos. 2,314,890, 2,358,019, 2,374,225, 2,374,226, 2,374,224 and 2,384,635.

The invention further includes the method of assembling connecting components to our improved ferrule, generally before the ferrule has been applied to and contracted upon the hose, which consists in employing the ferrule with the closed part-spherical end and subsequently forming one or more holes in such end at the required practicable position and securing the connecting component or components therein. The hole or each hole is preferably drilled substantially radially to the centre of the sphere at any position from that of coincidence with the axis of the ferrule to a position of 90° (or more) thereto.

The ferrule will preferably be formed initially with a closed end or end component but there may be cases in which a batch of ferrules would be required which would be standard as regards the position of one or more connecting components but where one or more additional components would be required whose position or position and size would vary as between different ferrules of the batch, in which case the ferrule could be performed with one or more holes and then drilled in the direction required to receive the additional connecting component or components.

What I claim is:

1. A hose and fitting comprising a ferrule and at least one externally projecting connecting component provided with a fluid passage and adapted at its outer end to couple the ferrule to a part external of the fitting, said ferrule comprising a cylindrical wall for securing around a hose and terminating in an end wall of part-spherical form both internally and externally so as to provide an internal part spherical cavity adapted to form an enlargement between the hose passage and the said passage in the connecting component, at least one aperture being formed in a chosen direction through said end wall and said connecting component being metal bonded to the apertured part of said wall and thereby fixed and sealed thereto so as to place the passage in said component into communication with said cavity but so that there is no substantial projection, if any, of said connecting component into said cavity.

2. A hose end fitting comprising a ferrule and at least one externally projecting connecting component provided with a fluid passage and formed at its inner end with a spigot and at its outer end to couple the ferrule with a part external to the fitting, said ferrule comprising a cylindrical wall adapted to be contracted and permanently deformed around a hose and terminating in an end wall which is externally of hemispherical form of the same radius as that of the external periphery of the cylindrical wall and which is internally of hemispherical form of smaller radius than that of the internal periphery of said cylindrical wall so as to form an internal shoulder, and through said internally and externally hemispherical end wall at least one aperture is formed into which the spigot end of a said connecting component is fitted and secured and sealed by a metal bond, said spigot end not intruding substantially, if at all, into said cavity and said cavity being adapted to provide an unobstructed enlargement between said passage in the connecting component and the passage through the hose.

3. A hose end fitting comprising a ferrule and at least one externally projecting connecting component provided with a fluid passage and adapted at its outer end to couple the ferrule to a part external of the fitting and provided at its inner end with a screw-threaded spigot, said ferrule comprising a cylindrical wall for securing around a hose and terminating in an end wall of part-spherical form both internally and externally so as to provide an internal part spherical cavity adapted to form an enlargement between the hose passage and the said passage in the connecting component, at least one aperture being formed in a chosen direction through said end wall and provided with a screw threaded wall, said spigot projecting sufficiently into said cavity to be provided with a swageable end and said swageable end being swaged to secure the connecting component in sealed connection with the ferrule but so that when such end is swaged there is no substantial projection of the spigot into the said cavity.

4. A hose end fitting comprising a ferrule, an insert having a portion to fit within the hose and provided with an external end collar to abut the end of the hose and having a longitudinal fluid passage, and at least one connecting component having a spigot and a fluid passage, said ferrule comprising a cylindrical wall for securing around the hose and terminating in an end wall of hemispherical form both internally and externally so as to provide an internal hemispherical cavity, said end wall being thicker than said cylindrical wall so as to provide an internal annular shoulder forming an abutment for said insert collar, at least one aperture being formed in a chosen direction in said end wall and the spigot of a said connecting component being fitted in said aperture and secured to make a metal to metal seal, said cavity forming a clear and unobstructed enlargement between the passages in the insert and the connecting component.

WALTER ARTHUR MELSOM.

REFERENCES CITED

The following references are of record in the file of this patent:

UNITED STATES PATENTS

| Number | Name | Date |
|---|---|---|
| 1,579,618 | Jensen | Apr. 6, 1926 |
| 1,974,476 | Wahl | Sept. 25, 1934 |
| 2,040,834 | Cowles | May 19, 1936 |
| 2,185,726 | Elliott | Jan. 2, 1940 |
| 2,432,598 | Weatherhead | Dec. 16, 1947 |